United States Patent
Jyono et al.

(10) Patent No.: US 6,437,072 B1
(45) Date of Patent: *Aug. 20, 2002

(54) DESCRIPTION CURABLE COMPOSITION

(75) Inventors: Hideharu Jyono, Kobe; Hidetoshi Odaka; Hiroshi Ito, both of Takasago; Hiroshi Iwakiri, Kobe, all of (JP)

(73) Assignee: Kaneka Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/537,802

(22) Filed: Mar. 29, 2000

(30) Foreign Application Priority Data

Mar. 29, 1999 (JP) ............................................ 11-085575
Mar. 30, 1999 (JP) ............................................ 11-088967

(51) Int. Cl.$^7$ .............................................. C08G 77/60
(52) U.S. Cl. ............................ 528/25; 528/15; 528/23; 528/31; 528/38; 524/742; 525/404
(58) Field of Search ........................ 524/742; 525/404; 528/15, 23, 25, 31, 38

(56) References Cited

U.S. PATENT DOCUMENTS

| | | | | |
|---|---|---|---|---|
| 4,242,466 A | * | 12/1980 | Schilling, Jr. et al. | |
| 4,578,497 A | * | 3/1986 | Onopchenko et al. | |
| 4,927,949 A | * | 5/1990 | Kabeta et al. | |
| 5,063,270 A | * | 11/1991 | Yukimoto et al. | |
| 5,342,914 A | * | 8/1994 | Iwakiri et al. | |
| 5,910,555 A | * | 6/1999 | Ueda et al. | |

FOREIGN PATENT DOCUMENTS

| | | |
|---|---|---|
| EP | 0 565 078 A1 | 10/1993 |
| EP | 0 693 513 A2 | 1/1996 |
| EP | 0 807 660 A2 | 11/1997 |
| EP | 1 036 807 A2 | 9/2000 |
| EP | 1 038 901 A2 | 9/2000 |
| JP | 5-70759 | 3/1993 |
| JP | 5-287188 | 11/1993 |
| JP | 09296046 | 11/1997 |

OTHER PUBLICATIONS

"Contemporary Polymer Chemistry, 2nd edition", Allcock et al., Prentice–Hall Inc., 1990, p. 2.*

* cited by examiner

*Primary Examiner*—Robert Dawson
*Assistant Examiner*—Marc Zimmer
(74) *Attorney, Agent, or Firm*—Connolly Bove Lodge & Hutz LLP

(57) ABSTRACT

The present invention has its object to provide a curable composition having good storage stability even when it contains a hydrolyzable silicon compound and/or an amino group-containing alkoxysilane or amino-substituted alkoxysilane derivative compound. This invention provides a curable composition which comprises (A) a reactive silicon group-containing polyether oligomer and at least one species selected from the following (B) and (C): (B) a hydrolyzable silicon compound having a hydrolyzable group bound to a silicon atom, said hydrolyzable group being more reactive with H$_2$O than the silicon group in the above reactive silicon group-containing polyether oligomer and (C) an amino group-containing alkoxysilane or amino-substituted alkoxysilane derivative compound,

11 Claims, No Drawings

DESCRIPTION CURABLE COMPOSITION

TECHNICAL FIELD

The present invention relates to a curable composition having good storage stability, which comprises a reactive silicon group-containing polyether oligomer and a hydrolyzable silicon compound having a hydrolyzable group bound to a silicon atom, said hydrolyzable group being more reactive with $H_2O$ than the silicon group in the reactive silicon group-containing polyether oligomer and/or an amino group-containing alkoxysilane or amino-substituted alkoxysilane derivative compound.

PRIOR ART

Room temperature curing compositions comprising a reactive silicon group-containing polyether oligomer, one or more of various additives and a silanol condensation catalyst are known in the art and are used as sealants, adhesives and so on.

It is known that when, in using the above oligomer in an one-component type curable composition, a hydrolyzable silicon compound having a hydrolyzable group bound to a silicon atom, said hydrolyzable group being more reactive with $H_2O$ than the silicon group in said oligomer, dehydration is effected in the system, so that storage stability can be secured (Japanese Kokai Publication Hei-05-287188).

However, this dehydration technique, which is based on the difference in reactivity with $H_2O$, allows the storage stability to decrease when the difference between the rate of reaction in the reaction of the silicon group of the reactive silicon group-containing polyether oligomer with $H_2O$ and the rate of reaction in the reaction of the dehydrating agent with $H_2O$ is small. Further, with the increase in $H_2O$ content, the decrease in storage stability becomes more remarkable.

On the other hand, it is also known that curable compositions comprising a reactive silicon group-containing polyether oligomer, when supplemented with an amino group-containing alkoxysilane or amino-substituted alkoxysilane derivative compound, acquires good adhesiveness to various adherents (Japanese Kokai Publication Hei-05-70759).

However, when such amino group-containing alkoxysilane or amino-substituted alkoxysilane derivative compound is admixed with the reactive silicon group-containing polyether oligomer in the presence of water, the amino group functions as a curing catalyst and the condensation reaction proceeds between the silicon groups in the reactive silicon group-containing polyether oligomer, resulting in worsening of the storage stability. Therefore, it is necessary to use the amino group-containing alkoxysilane or amino-substituted alkoxysilane derivative compound, which is a tackifier, by adding it to one-component type curable compositions which can be tightly sealed in a low water content condition or by admixing it with the reactive silicon group-containing polyether oligomer just prior to use.

SUMMARY OF THE INVENTION

It is an object of the present invention to provide a curable composition having good storage stability even when it contains a hydrolyzable silicon compound and/or an amino group-containing alkoxysilane or amino-substituted alkoxysilane derivative compound, by reducing the reactivity of the silicon group of the reactive silicon group-containing polyether oligomer through introduction of a methyl group into said oligomer in the vicinity of said silicon group. Another object of the invention is to provide a curable composition having better storage stability as compared with the prior art in the case of a hydrolyzable silicon compound being added as a dehydrating agent, by widening the difference in rate of reaction with $H_2O$ between the dehydrating agent and the above-mentioned oligomer. A further object of the invention is to provide a curable composition with an advantageously enlarged range of dehydrating agents usable therein by reducing the reactivity of the silicon group of said oligomer to thereby make it possible to use those hydrolyzable silicon compounds which can never been used in the prior art.

A still further object of the invention is to provide a novel curable composition showing good storage stability even in the presence of water, in case of adding an amino group-containing alkoxysilane or amino-substituted alkoxysilane derivative compound, reducing the reactivity of the silicon group of the reactive silicon group-containing polyether oligomer through introduction of a methyl group into said oligomer in the vicinity of said silicon group.

Thus, in accordance with a first aspect of the present invention, there is provided a curable composition which comprises (A) a reactive silicon group-containing polyether oligomer and at least one species selected from the following (B) and (C):

(B) a hydrolyzable silicon compound having a hydrolyzable group bound to a silicon atom, said hydrolyzable group being more reactive with $H_2O$ than the silicon group in the above reactive silicon group-containing polyether oligomer and (C) an amino group-containing alkoxysilane or amino-substituted alkoxysilane derivative compound, said (A) reactive silicon group-containing polyether oligomer having a partial structure of the general formula (1) per molecule:

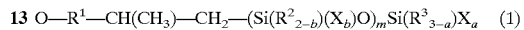

13 O—R$^1$—CH(CH$_3$)—CH$_2$—(Si(R$^2_{2-b}$)(X$_b$)O)$_m$Si(R$^3_{3-a}$)X$_a$    (1)

wherein $R^1$ represents a divalent organic group containing 1 to 20 carbon atoms and one or more constituent atoms selected from the group consisting of hydrogen, oxygen and nitrogen; $R^2$ and $R^3$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula (R')$_3$SiO—; when 2 or more $R^2$ or $R^3$ groups are present, they may be the same or different; R' represents a monovalent hydrocarbon group containing 1 to 20 carbon atoms and three R' groups may be the same or different; X represents a hydroxyl group or a hydrolyzable group and when two or more X groups are present, they may be the same or different; a represents 0, 1, 2 or 3; b represents 0, 1 or 2; b may be the same or different over m repeats of (Si(R$^2_{2-b}$)(X$_b$)O); m represents an integer of 0 to 19; provided that the relation of a+Σb≧1 is satisfied.

A preferred mode of embodiment is concerned with said curable composition wherein $R^1$ in said (A) represents $CH_2$.

A more preferred mode of embodiment is concerned with the above curable composition wherein said (A) reactive silicon group-containing polyether oligomer has a partial structure of the following formula:

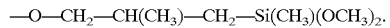

—O—CH$_2$—CH(CH$_3$)—CH$_2$—Si(CH$_3$)(OCH$_3$)$_2$.

Another preferred mode of embodiment is concerned with the curable composition wherein said (A) reactive silicon group-containing polyether oligomer is obtainable by reacting a polyether oligomer containing an unsaturated bond of the following general formula (2):

$$—O—R^1—C(CH_3)=CH_2 \quad (2)$$

$R^1$ is as defined above,
with a reactive silicon group-containing compound of the following general formula (3):

$$H—(Si(R^2_{2-b})(X_b)O)_m Si(R^3_{3-a})X_a \quad (3)$$

$R^2$, $R^3$, a, b, m and X are as defined above,
in the presence of a catalyst and a sulfur compound in an oxygen-containing atmosphere.

Another more preferred mode of embodiment is concerned with the curable composition
wherein said (A) reactive silicon group-containing polyether oligomer has a partial structure of the following formula:

$$—O—CH_2—CH(CH_3)—CH_2—Si(CH_3)(OCH_3)_2$$

said (A) being obtainable by reacting a polyether oligomer containing an unsaturated bond of the following formula:

$$—O—CH_2—C(CH_3)=CH_2$$

with a reactive silicon group-containing compound represented by the following formula:

$$H—Si(CH_3)(OCH_3)_2$$

in the presence of a catalyst and a sulfur compound in an oxygen-containing atmosphere.

Another more preferred mode of embodiment is concerned with the curable composition
wherein, in said (A) reactive silicon-containing polyether oligomer, the number of reactive silicon group is not less than 85% of the number of molecular chain terminals.

DETAILED DESCRIPTION OF THE INVENTION

The present invention is now described in detail. The reactive silicon group-containing polyether oligomer for use as the component (A) in the present invention may be any polyether oligomer having a polyether main chain and, in a side chain thereof or in a terminal position thereof, at least one partial structure of the following general formula (1):

$$—O—R^1—CH(CH_3)—CH_2—(Si(R^2_{2-b})(X_b)O)_m Si(R^3_{3-a})X_a \quad (1)$$

wherein $R^1$ represents a divalent organic group containing 1 to 20 carbon atoms and one or more constituent atoms selected from the group consisting of hydrogen, oxygen and nitrogen; $R^2$ and $R^3$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO—$; when 2 or more $R^2$ or $R^3$ groups are present, they may be the same or different; R' represents a monovalent hydrocarbon group containing 1 to 20 carbon atoms and three R' groups may be the same or different; X represents a hydroxyl group or a hydrolyzable group and when two or more X groups are present, they may be the same or different; a represents 0, 1, 2 or 3; b represents 0, 1 or 2; b may be the same or different over m repeats of $(Si(R^2_{2-b})(X_b)O)$; m represents an integer of 0 to 19; provided, however, that the relation of $a+\Sigma b \geq 1$ is satisfied.

In the reactive silicon group-containing oligomers so far used in the art, the reactive silicon group is bound to the main chain via a straight-chain alkyleneoxy group such as the structure $—O—CH_2—CH_2—CH_2—$, for instance, and therefore is so high in reactivity that, when used in combination with a hydrolyzable silicon compound, which is a dehydrating agent, and/or an amino group-containing alkoxysilane or amino-substituted alkoxysilane derivative compound, which is a tackifier, said oligomer may be poor in storage stability. In accordance with the present invention, the reactive silicon group is bound to the oligomer main chain via the structure $—O—R^1—CH(CH_3)—CH_2—$ having a branching methyl group. By providing a side chain methyl in that manner to thereby controlling the rate of reaction of the reactive silicon group, it is possible to obtain curable compositions having good storage stability.

$R^1$ represents a divalent organic group containing 1 to 20 carbon atoms and one or more constituent atoms of the group consisting of hydrogen, oxygen and nitrogen. As said divalent organic group, there can be mentioned $—CH_2—$, $—C_2H_4—$, $—C_3H_6—$, $—C_4H_8—$, $—C_5H_{10}—$, $—C_6H_4—$, $—C_6H_{12}—$, $—C_7H_{14}—$, $—C_8H_{16}—$, $—C_9H_{18}—$, $—C_{10}H_{20}—$, $—CH(CH_3)—$, $—CH_2—CH(CH_3)—$, $—CH_2—CH(CH_3)—CH_2—$, $—C_2H_4—CH(CH_3)—$, $—CH_2—C_6H_4—$, $—CH_2—C_6H_4—CH_2—$, $—C_2H_4—C_6H_4—$, $—C(O)—$, $—C(O)—CH_2—$, $—C(O)—C_6H_4—$, $—C(O)—NH—$, $—C(O)—NH—CH_2—$, $—C(O)—NH—C_6H_4—$, $—C(O)—O—$, $—C(O)—O—CH_2—$, and $—C(O)—O—C_6H_4—$. Among these, $—CH_2—$, $—C_2H_4—$, $—CH_2—CH(CH_3)—$, $—C(O)—$, and $—C(O)—NH—$ are preferred in view of the ease of synthesis. From the availability of the starting material, $—CH_2—$ is particularly preferred.

$R^2$ and $R^3$ include alkyl groups such as methyl, ethyl, etc.; cycloalkyl groups such as cyclohexyl etc.; aryl groups such as phenyl etc.; aralkyl groups such as benzyl etc.; and trioganosiloxy groups of the formula $(R')_3SiO—$ where R' may for example be methyl or phenyl. Among them, methyl is particularly preferred for $R^2$, $R^3$ and R'.

The reactive silicon group in the reactive silicon group-containing polyether oligomer of general formula (1) includes groups of the general formula (4):

$$—(Si(R^2_{2-b})(X_b)O)_m Si(R^3_{3-a})X_a \quad (4)$$

wherein $R^2$ and $R^3$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO—$; when 2 or more $R^2$ or $R^3$ groups are present, they may be the same or different; R' represents a monovalent hydrocarbon group containing 1 to 20 carbon atoms and three R' groups may be the same or different; X represents a hydroxyl group or a hydrolyzable group and when two or more X groups are present, they may be the same or different; a represents 0, 1, 2 or 3; b represents 0, 1 or 2; b may be the same or different over m repeats of $(Si(R^2_{2-b})(X_b)O)$; m represents an integer of 0 to 19; provided, however, that the relation of $a+\Sigma b \geq 1$ is satisfied.

The reactive silicon group in the context of the present invention is capable of forming a siloxane bond on intermolecular condensation.

Referring to X, the hydrolyzable group is not particularly restricted but includes various known hydrolyzable groups.

As specific examples, there can be mentioned hydrogen, halogen, alkoxy, acyloxy, ketoximato, amino, amido, acid amino, aminoxy, mercapto, and alkenyloxy, among others. In view of hydrolyzability under mild conditions and ease of handling, alkoxy groups such as methoxy, ethoxy, propoxy, isopropoxy, etc. are preferred among them.

The hydroxyl group and/or hydrolyzable group may be attached, in the number of 1 to 3, to one silicon atom and (a+Σb) is preferably 1 to 5. When two or more hydroxyl or hydrolyzable groups are present in the reactive silicon group, they may be the same or different.

The number of silicon atoms in the reactive silicon group may be only one or more than 1, and may be about 20 when silicon atoms are joined in the manner of siloxane bonding, for instance.

Preferred, in view of the ease of availability, is a reactive silicon group of the following general formula (5):

$$—Si(R^3_{3-a})X_a \qquad (5)$$

wherein $R^3$, $X$ and $a$ are as defined above.

The average number of reactive silicon groups per molecular chain terminal in the polyether oligomer is preferably at least 0.1 and, from curability points of view, is preferably 0.5 to 5. The more preferred number is 0.8 to 2. From the standpoint of providing a cured product showing satisfactory rubber-like elastic properties, the reactive silicon group preferably exists in the average number of 0.9 to 1.

More particularly, the reactive silicon group-containing polyether oligomer (A) preferably has a partial structure of the following formula per molecule.

$$—O—CH_2—CH(CH_3)—CH_2—Si(CH_3)(OCH3)_2$$

The molecular weight of the polyether oligomer (A) in the present invention is not particularly restricted but is preferably 1,000 to 100,000 in terms of number average molecular weight. When the number average molecular weight is less than 1,000, the reactive silicon group-containing polyether oligomer will give a fragile product on curing. When the number average molecular weight exceeds 100,000, the functional group concentration will become so low that the curing rate will be decreased. Moreover, the viscosity of the oligomer will become too high to be handled with ease. From the standpoint of viscosity of the reactive silicon group-containing oligomer obtained, the number average molecular weight is more preferably within the range of 5,000 to 50,000.

The number average molecular weight of the polyether oligomer as so referred to herein is defined as the number average molecular weight determined by directly measuring the terminal group concentration by titration based on the principles of the hydroxy value determination method according to JIS K 1557 and the iodine value determination method according to JIS K 0070 and taking the structure of the polyether oligomer into consideration. It is also possible to determine the number average molecular weight by a relative measurement method which comprises constructing a working curve for the polystyrene converted molecular weight determined by general GPC measurement and the above terminal group-based molecular weight and making the conversion from GPC-based molecular weight to terminal group-based molecular weight.

The main chain structure of the polyether oligomer (A) need only be a polymer structure comprising an —R—O— structure as a repeating unit, where R may be any divalent organic group containing 1 to 20 carbon atoms and one or more constituent atoms selected from the group consisting of hydrogen, oxygen and nitrogen. It may also be a homopolymer which is exclusively composed of the same repeating unit or a copolymer comprising two or more kinds of repeating units. Furthermore, the main chain structure may be branched. The component (A) according to the present invention may be a hydroxyl group-containing polyether obtainable by, for example, the following various methods.

For preparing the component (A) of the present invention, a polyether can be used, which is obtainable by subjecting a substituted or unsubstituted epoxy compound having 2 to 12 carbon atoms and, as an initiator, a dihydric or polyhydric alcohol or a hydroxyl-containing oligomer to ring-opening polymerization in the presence of a catalyst, said epoxy compound being, for example, an alkylene oxide, e.g. ethylene oxide, propylene oxide, α-butylene oxide, β-butylene oxide, hexene oxide, cyclohexene oxide, styrene oxide, α-methylstyrene oxide, etc., or an alkyl, allyl or aryl glycidyl ether, e.g. methyl glycidyl ether, ethyl glycidyl ether, isopropyl glycidyl ether, butyl glycidyl ether, allyl glycidyl ether, phenyl glycidyl ether, etc., said dihydric or polyhydric alcohol being, for example, ethylene glycol, propylene glycol, butanediol, hexamethylene glycol, methallyl alcohol, hydrogenated bisphenol A, neopentyl glycol, polybutadienediol, diethylene glycol, triethylene glycol, polyethylene glycol, polypropylene glycol, polypropylenetriol, polypropylenetetraol, dipropylene glycol, glycerol, trimethylolmethane, trimethylolpropane, pentaerythritol, etc. The catalyst used for this polymerization reaction includes various known catalysts, such as alkaline catalysts, e.g. KOH, NaOH, etc.; acidic catalysts such as trifluoroborane-etherate; or double metal cyanide complex catalysts such as aluminoporphyrin metal complexes and cobalt zinc cyanide-glyme complexes. Particularly preferred is a double metal cyanide complex catalyst less liable to involve side reactions, although it is not an exclusive choice.

Production of component (A) from a hydroxyl group-containing polyether oligomer can be carried out by the known method, for example by the process which comprises introducing an unsaturated bond into the hydroxyl group-containing polyether oligomer and reacting the same with a reactive silicon group-containing compound.

The method of introducing an unsaturated bond into the hydroxyl group-containing polyether oligomer may for example be the method via ether bonding, ester bonding, urethane bonding, or carbonate bonding. For the introduction of an unsaturated group by ether bonding, for instance, the hydroxyl group of the polyether oligomer is first metaloxylated to —OM, where M is Na or K, and the oligomer is then reacted with an organohalogen compound of the general formula (6) to give an unsaturated group-containing polyether.

$$H_2C=C(CH_3)—R^1—Y \qquad (6)$$

wherein $R^1$ represents a divalent organic group containing 1 to 20 carbon atoms and at least one member selected from the group consisting of hydrogen, oxygen and nitrogen; $Y$ represents halogen.

As a process for reacting the unsaturated bond-introduced polyether oligomer with the reactive silicon group-containing compound, there can be mentioned a hydrosilylation reaction in the presence of a catalyst. To promote the reaction, this hydrosilylation reaction is preferably carried out in an oxygen-containing atmosphere and in the presence of an additive such as a sulfur compound.

The reactive silicon group-containing compound for use in this hydrosilylation reaction need only contain at least one silicon group bound to said hydroxyl or hydrolyzable group within its molecule and at least one Si-H group per molecule. As representative examples, compounds of the following general formula (3) can be mentioned:

$$H\!-\!(Si(R^2{}_{2-b})(X_b)O)_m Si(R^3{}_{3-a})X_a \qquad (3)$$

wherein $R^2$, $R^3$, a, b, m and X are respectively the same as defined in general formula (1).

More particularly, there can be mentioned halogenated silanes such as trichlorosilane, methyldichlorosilane, dimethylchlorosilane, phenyldichlorosilane, trimethylsiloxymethylchlorosilane, 1,1,3,3-tetramethyl-1-bromodisiloxane, etc.; alkoxysilanes such as trimethoxysilane, triethoxysilane, methyldiethoxysilane, methyldimethoxysilane, phenyldimethoxysilane, trimethylsiloxymethylmethoxysilane, trimethylsiloxydiethoxysilane, etc.; acyloxysilanes such as methyldiacetoxysilane, phenyldiacetoxysilane, triacetoxysilane, trimethylsiloxymethylacetoxysilane, trimethylsiloxydiacetoxysilane, etc.; ketoximatosilanes such as bis(dimethylketoximato)methylsilane, bis(cyclohexylketoximato)methylsilane, bis(diethylketoximato)trimethylsiloxysilane, bis(methylethylketoximato)methylsilane, tris(acetoximato) silane, etc.; and alkenyloxysilanes such as methylisopropenyloxysilane, etc. Among these, alkoxysilanes are preferred, with methoxy being particularly preferred.

From availability points of view, reactive silicon groups of the following general formula (7) are preferred, $$H\!-\!Si(R^3{}_{3-a})X_a \qquad (7)$$

wherein $R^3$, X and a are as defined hereinbefore.

Referring to general formulas (3) and (7), $R^2$ and $R^3$ each may for example be an alkyl group, e.g. methyl or ethyl; a cycloalkyl group, e.g. cyclohexyl; an aryl group, e.g. phenyl; an aralkyl group, e.g. benzyl, or a triorganosiloxy group of the formula $(R')_3SiO$— where R' may for example be methyl or phenyl. For $R^2$, $R^3$ and R', methyl is particularly preferred.

Referring to said hydrosilylation reaction, preferred is the reactive silicon group-containing polyether oligomer containing the reactive silicon group obtainable by reacting a polyether oligomer containing the unsaturated bond of general formula (2):

$$-\!O\!-\!R^1\!-\!C(CH_3)\!=\!CH_2 \qquad (2)$$

$R^1$ is as defined hereinbefore,
with a reactive silicon group-containing compound represented by general formula (3):

$$H\!-\!(Si(R^2{}_{2-b})(X_b)O)_m Si(R^3{}_{3-a})X_a \qquad (3)$$

$R^2$, $R^3$, a, b, m and X are as defined in general formula (1), in the presence of a catalyst and a sulfur compound in an oxygen-containing atmosphere, and more preferred is the reactive silicon group-containing polyether oligomer having a partial structure of the following structure:

$$-\!O\!-\!CH_2\!-\!CH(CH_3)\!-\!CH_2\!-\!Si(CH_3)(OCH_3)_2$$

said (A) being obtainable by reacting a polyether oligomer containing an unsaturated bond of the following formula:

$$-\!O\!-\!CH_2\!-\!C(CH_3)\!=\!CH_2$$

with a reactive silicon group-containing compound represented by the formula:

$$H\!-\!Si(CH_3)(OCH_3)_2$$

in the presence of a catalyst and a sulfur compound in an oxygen-containing atmosphere.

Furthermore, in the present invention, the hydrolyzable group X in the silyl group obtained can be converted to a different hydrolyzable group. Particularly when X is a halogen atom, a hydrogen halide with an intense irritating odor is emanated in moisture-curing and, therefore, X is preferably converted to a different type of hydrolyzable group. The hydrolyzable functional group to which this conversion can be made includes alkoxy, acyloxy, ketoximato, amido, acid amino, aminoxy and mercapto, among others. A variety of methods can be utilized for conversion of a halogen functional group to such a different type of hydrolyzable group. The method for conversion to an alkoxy group, for instance, includes a process which comprises reacting the halogen functional group with (1) an alcohol or phenol, e.g. methanol, ethanol, 2-methoxyethanol, sec-butanol, tert-butanol, phenol, etc., (2) an alkoxide, e.g. an alcoholate or phenolate of sodium, potassium or lithium, (3) an ortho-formate, e.g. methyl ortho-formate, ethyl ortho-formate, etc., or (4) an epoxy compound such as ethylene oxide, propylene oxide, allyl glycidyl ether, etc. Particularly, this conversion reaction can be easily carried out with satisfactory results by using the combination of (1) with (3), namely an alcohol or a phenol with an ortho-formate, or the combination of (1) with (4), namely an alcohol or a phenol with an epoxy compound. The method for conversion to an acyloxy group includes a process which comprises reacting the halogen functional group with (1) a carboxylic acid, e.g. acetic acid or propionic acid, (2) an acid anhydride, e.g. acetic anhydride, or (3) the sodium, potassium or lithium salt of a carboxylic acid. Similarly, the method for conversion to an aminoxy group includes a process which comprises reacting the halogen functional group with (1) a hydroxylamine, e.g. N,N-dimethylhydroxylamine, N,N-diethylhydroxylamine, N,N-methylphenylhydroxylamine or N-hydroxypyrrolidine, or (2) the sodium, potassium or lithium salt of a hydroxylamine. The method for conversion to an amido group includes a process in which comprises reacting the halogen functional group with (1) a primary or secondary amine, e.g. N,N-dimethylamine, N,N-diethylamine, N-methylphenylamine or pyrrolidine, or (2) the sodium, potassium or lithium salt of a primary or secondary amine. The method for conversion to an acid amino group includes a process which comprises reacting the halogen functional group with (1) an acid amide having at least one hydrogen atom on the nitrogen atom, e.g. acetamide, formamide or propionamide or (2) the sodium, potassium or lithium salt of such an acid amide. When a combination of a ketoxime, e.g. acetoxime or methyl ethyl ketoxime, or a mercaptan, e.g. N-octylmercaptan or t-butylmercaptan, is used in combination with an ortho-formate or an epoxy compound, some of the available halogen functional groups can be converted to ketoximato or mercapto groups, with the others being converted to the alkoxy groups derived from the ortho-formate or epoxy compound used. It is not that only halogen functional groups can be converted to other kinds of hydrolyzable groups but various kinds of hydrolyzable groups can be converted to different hydrolyzable groups.

The hydrosilylation reaction in the production process according to the present invention is preferably carried out generally at 10 to 200° C., preferably at 20 to 150° C., and more preferably within the temperature range of 40 to 120° C. Depending on the need for controlling the reaction temperature or the viscosity of the reaction system, a solvent such as benzene, toluene, xylene, tetrahydrofuran, methylene chloride, pentane, hexane or heptane can be used.

The catalyst which can be used with advantage in the reaction of the unsaturated bond-introduced polyether oligomer with the reactive silicon group-containing compound includes metal complex catalysts of metals selected from among Group VIII transition metal elements such as platinum, rhodium, cobalt, palladium and nickel. For example, such compounds as $H_2PtCl_6 \cdot 6H_2O$, platinum-vinylsiloxane complexes, platinum-olefin complexes, Pt metal, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, etc. can be employed. However, from the standpoint of reactivity of the hydrosilylation reaction, it is particularly preferable to use either a platinum-vinylsiloxane complex or a platinum-olefin complex. The platinum-vinylsiloxane complex is a generic term denoting any compound of platinum with a vinyl group-containing siloxane, polysiloxane or cyclosiloxane coordinated as a ligand, and as specific examples of said ligand, there can be mentioned 1,1,3,3-tetramethyl-1,3-divinyldisiloxane and 1,3,5,7-tetramethyl-1,3,5,7-tetravinylcyclotetrasiloxane, among others. The olefinic ligand of said platinum-olefin complex includes 1,5-hexadiene, 1,7-octadiene, 1,9-decadiene, 1,11-dodecadiene and 1,5-cyclooctadiene, among others. Among these ligands, 1,9-decadiene is particularly preferred.

The platinum-vinylsiloxane complexes and platinum-olefin complexes are disclosed in Japanese Kokoku Publication Hei-8-9006.

The amount of use of the catalyst is not particularly restricted but, generally speaking, the amount of the platinum catalyst is preferably $10^{-1}$ to $10^{-8}$ moles, more preferably $10^{-3}$ to $10^{-6}$ moles, per mole of the alkenyl group. If the amount of the catalyst is too small, the hydrosilylation reaction may fail to proceed sufficiently. If the amount of the catalyst is too excessive, the large catalyst consumption will be reflected in an increased production cost and increased catalyst residues in the product.

From the standpoint of promoting the hydrosilylation reaction, it is preferable to make molecular oxygen available in the reaction system for reactivation of the catalyst (Japanese Kokai Publication Hei-8-283339) and adding a sulfur compound. Addition of a sulfur compound enables reduction in production time without involving an increase in production cost due to increased requirements for the expensive platinum catalyst or the trouble of removing the residual catalyst, thus contributing to enhanced productivity. As said sulfur compound, there can be mentioned elemental sulfur, thiols, sulfides, sulfoxides, sulfones and thioketones, and elemental sulfur is particularly preferred but not an exclusive choice. For addition of a sulfur compound to a liquid reaction system, the sulfur compound maybe dissolved in a portion of the reaction mixture or of the solvent to be used and, then, the solution be added to the reaction system, whereby a uniform dispersion can be obtained. For example, the sulfur compound can be dissolved in an organic solvent such as toluene, hexane or xylene and, then, added.

The addition amount of the sulfur compound can be typically selected from the range of 0.1 to 10 times the number of moles of the metal catalyst, $10^{-3}$ to $10^{-6}$ times the number of moles of the alkenyl group, or 0.001 to 10 ppm based on the total weight of the reaction mixture. If the addition amount is too low, the effect of the invention will not necessarily be attained. If the sulfur compound is added in an excessively large amount, there may at times be encountered a reduction in the catalyst activity or an inhibition in the progress of reaction. Therefore, a judicious selection of the amount of sulfur is recommended.

The hydrosilylation reaction in the production process. according to the present invention can be carried out in the absence of a solvent or in the presence of a suitable solvent. As the solvent for this hydrosilylation reaction, hydrocarbons, halogenated hydrocarbons, ethers and esters can be generally used, although specifically the use of hexane, toluene, xylene, methylene chloride, tetrahydrofuran, diethyl ether or ethylene glycol dimethyl ether is preferred. Particularly in the hydrosilylation of a compound of high molecular weight, the use of a solvent is preferred for assuring dissolution or reduction in viscosity. In this connection, the plasticizer for use in the final formulation of a compound of high molecular weight can be utilized as the reaction solvent.

In the hydrosilylation reaction according to the present invention, the atmosphere within the hydrosilylation reactor may be exclusively composed of an inert gas, such as nitrogen or helium gas, or may contain oxygen. Hydrosilylation reactions are sometimes conducted in the presence of an inert gas, e.g. nitrogen or helium gas, from the standpoint of safety of inflammable gas handling. However, when a hydrosilylation reaction is carried out in an inert gas atmosphere, such as nitrogen or helium gas, the conversion rate may be low depending on the conditions of reaction used.

In the process according to the present invention, the progress of hydrosilylation reaction can be safely promoted by using oxygen at an amount capable of avoiding explosive mixture-forming concentration level. Thus, the oxygen concentration of the reactor gas phase may for example be 0.5 to 10%.

Furthermore, in order to inhibit oxidation of the polyether oligomer, reaction solvent and/or plasticizer in the hydrosilylation reaction system by the oxygen present, the hydrosilylation reaction can be conducted in the presence of an antioxidant. As said antioxidant, there can be mentioned phenolic antioxidants having a radical chain-terminating function, such as 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis{methylene-3(3,5-di-tert-butyl-4-hydroxyphenyl)propionate}methane, and 1,1,3-tris(2-methyl-4-hydroxy-5-tert-butylphenyl)butane. As other radical chain terminators, there can be mentioned amine series antioxidants such as phenyl-β-naphthylamine, α-naphthylamine, N,N'-di-sec-butyl-p-phenylenediamine, phenothiazine, N,N'-diphenyl-p-phenylenediamine, etc. Those antioxidants are by no means exclusive choices, however.

In accordance with the process of the present invention, there can be obtained a reactive silicon group-containing polyether oligomer in which the average number of reactive silicon groups is not less than 85% of the total number of molecular chain terminals of the oligomer. By using a polyether oligomer with a silylation rate of not less than 85%, a curable composition having physical properties required of a sealant (breaking strength, elongation at break, etc.) as well as very satisfactory bond strength can be obtained.

The silylation rate may be determined by various methods. In the state of the art, accurate values can be found by NMR analysis. Thus, the silylation rate can be found by calculating the ratio of the number of molecular chain terminals into which the reactive silicon group has been introduced to the number of terminals not carrying such groups from the NMR data.

The reactive silicon group-containing polyether oligomer for use as component (A) may be a single species or a combination of two or more species.

The curable composition of the present invention comprises, in addition to the above component (A), (B) a hydrolyzable silicon compound having a hydrolyzable group bound to a silicon atom, said hydrolyzable group being more reactive with $H_2O$ than the silicon group in the above reactive silicon group-containing polyether oligomer and/or (C) an amino group-containing alkoxysilane or amino-substituted alkoxysilane derivative compound.

Thus, the curable composition of the invention may comprise the components (A) and (B), the components (A) and (C), or all the three components (A), (B) and (C). In each case, the curable composition can have good storage stability.

The (B) hydrolyzable silicon compound in the present invention, includes, as a class, low-molecular silicon compounds having one or more hydrolyzable functional groups reacting in the presence of moisture. The hydrolyzable functional group mentioned above is bound to a silicon atom and more readily reactive with $H_2O$ than the silicon group in the (A) reactive silicon group-containing polyether oligomer. It is generally preferred that the compound have a molecular weight of not more than 300.

As the hydrolyzable functional group, there may be mentioned alkoxy groups, acyloxy groups, ketoximato groups, amino groups, aminooxy groups, amido groups, alkenyloxy groups and the like. As substituents, there may be mentioned epoxy-containing groups, amino-containing groups, acryloyl-containing groups, mercapto-containing groups and so forth. As specific examples of such compound, there may be mentioned $Si(OC_2H_5)_4$, $CH_2=CHSi(OC_2H_5)_3$, $CH_2=CHSi(OCH_3)_3$, $CH_2=CHSi(OAc)_3$, $CH_3—Si[ON=C(CH_3)(C_2H_5)]_3$, $CH_3Si[N(CH_3)_2]_3$, $CH_3Si[N(CH_3)(C_2H_5)]_3$, $CH_3Si[N(CH_3)Ac]_3$, $CH_3Si[OC(C_2H_5)=CH_2]_3$, $H_2(O)CHCH_2O(CH_2)_3Si(OCH_3)_3$, $CH_2(O)CHCH_2O(CH_2)_3Si(OCH_2CH_3)_3$, $CH_3CH_2Si(OCH_3)_3$, $CH_3CH_2Si(OCH_2CH_3)_3$, $CH_2=C(CH_3)COO(CH_2)_3Si(OCH_3)_3$, $CH_2=C(CH_3)COO(CH_2)_3Si(OCH_2CH_3)_3$, $HS(CH_2)_3Si(OCH_3)_3$, $HS(CH_2)_3Si(OCH_2CH_3)_3$, etc.

These dehydrating agents may be used singly or in combination. These dehydrating agents are used recommendably in an amount of about 0.01 to 20 parts by weight per 100 parts by weight of the reactive silicon group-containing polyether oligomer. As specific examples of the amino group-containing alkoxysilane or amino-substituted alkoxysilane derivative compound (C), there may be mentioned amino-substituted alkoxysilanes such as γ-aminopropyltrimethoxysilane,
γ-aminopropyltriethoxysilane,
γ-aminopropylmethyldimethoxysilane,
N-(β-aminoethyl)-γ-aminopropyltrimethoxysilane,
N-(β-aminoethyl)-γ-aminopropyltriethoxysilane,
N-(β-aminoethyl)-γ-aminopropylmethyldimethoxysilane and
1,3-diaminoisopropyltrimethoxysilane, and reaction products from such an amino-substituted alkoxysilane and an epoxysilane compound as mentioned above, such as γ-glycidoxypropyltrimethoxysilane,
γ-glycidoxypropyltriethoxysilane,
γ-glycidoxypropylmethyldimethoxysilane,
β-(3,4-epoxycyclohexyl)ethyltrimethoxysilane, or reaction products from such an amino-substituted alkoxysilane as mentioned above and a methacryloyloxysilane compound, such as methacryloxypropyltrimethoxysilane, methacryloxypropyltris(methoxyethoxy)silane, methacryloxypropyltriethoxysilane or methacryloxypropylmethyldimethoxysilane. The reaction of the amino-substituted alkoxysilane with the epoxysilane compound or acryloylsilane compound can be carried out with ease by admixing each mole of the amino-substituted alkoxysilane with 0.2 to 5 moles of the counterpart silane compound and stirring the mixture at a temperature within the range of room temperature to 180° C. for 1 to 8 hours.

The above amino-substituted alkoxysilane or amino-substituted alkoxysilane derivative compound (C) is used preferably in an amount of 0.01 to 20 parts by weight per 100 parts by weight of the polyether oligomer having a terminal crosslinkable and hydrolyzable silyl functional group. At an addition amount lower than 0.01 part by weight, the expected expression of adhesiveness is hardly attained. At an amount exceeding 20 parts by weight, adverse influences are produced on the rubber characteristics after curing.

The mixture of the present invention which comprises the reactive silicon group-containing polyether oligomer (A) and the above hydrolyzable silicon compound (B) and/or the above amino-substituted alkoxysilane or amino-substituted alkoxysilane derivative compound (C) is cured by moisture in the air at room temperature in the presence of a curing catalyst to give coatings excellent in adhesion to metals, glass and so forth and is useful as a coating composition, sealing composition, paint composition or adhesive composition for buildings, airplanes, automobiles and the like.

Usable as the curing catalyst are conventional silanol condensation catalysts. These catalysts may be used singly or two or more of them may be used in combination.

As specific examples of the curing catalyst, there may be mentioned titanate esters such as tetrabutyl titanate and tetrapropyl titanate; tin carboxylate compounds such as dibutyltin dilaurate, dibutyltin maleate, dibutyltin diacetate, stannous octoate and stannous naphthenate; reaction products from dibutyltin oxide and phthalate esters; dibutyltin diacetylacetonate; organic aluminum compounds such as aluminum trisacetylacetonate, aluminum tris(ethyl acetoacetate) and diisopropoxyaluminum ethyl acetoacetate; chelate compounds such as zirconium tetraacetylacetonate and titanium tetraacetylacetonate; lead octylate; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), and carboxylic acid salts and other salts of these amine compounds; low-molecular polyamide resins obtained from an excess of a polyamine and a polybasic acid; reaction products from an excess of a polyamine and an epoxy compound; amino-containing silane coupling agents such as γ-aminopropyltrimethoxysilane and N-(β-aminoethyl)aminopropylmethyldimethoxysilane; and like silanol condensation catalysts as well as other known silanol condensation catalysts inclusive of acidic catalysts and basic catalysts. These catalysts may be used singly or two or more of them may be used combinedly.

These silanol condensation catalysts are used preferably in an amount of about 0.1 to 20 parts by weight, more preferably about 1 to 10 parts by weight, per 100 parts by weight of the reactive silicon group-containing polyether oligomer. When the amount of the silanol condensation catalyst is too small relative to the reactive silicon group-containing polyether oligomer, the rate of curing will be unfavorably slow and the curing reaction will hardly proceed to a sufficient extent. When, on the other hand, the amount of the silanol condensation catalyst is excessive relative to the reactive silicon group-containing polyether oligomer, local heat generation or foaming may unfavorably occur in the step of curing, making it difficult to obtain good cured products.

The curable composition of the present invention may be supplemented, if necessary, with one or more additives selected from among various plasticizers, fillers, solvents and so forth.

As specific examples of the plasticizer, there may be mentioned phthalate esters such as dibutyl phthalate, diheptyl phthalate, di(2-ethylhexyl)phthalate, butyl benzyl phthalate and butyl phthalylbutyl glycolate; nonaromatic dibasic acid esters such as dioctyl adipate and dioctyl sebacate; phosphate esters such as tricresyl phosphate and tributyl phosphate, and the like. As relatively high-molecular type plasticizers, there may be mentioned polyester plasticizers such as polyesters from dibasic acids and dihydric alcohols; polyethers such as polypropylene glycol and derivatives thereof; polystyrenes such as poly-α-methylstyrene and polystyrene; and so on.

Particularly for preventing the sotrage stability of the composition and the cure rate thereof after storage from decreasing, the use of polyethers is preferred.

These plasticizers may be used singly or in combination. These plasticizers are used in an amount of about 20 to 400 parts by weight per 100 parts by weight of the reactive silicon group-containing polyether oligomer.

As specific examples of the above filler, there may be mentioned, among others, inorganic fillers such as wood flour, walnut shell flour, rice hull flour, pulp, cotton chips, mica, graphite, diatomaceous earth, china clay, kaolin, clay, talc, silicic anhydride, ground quartz, aluminum powder, zinc powder, asbestos, glass fiber, carbon fiber, glass beads, magnesium carbonate, titanium oxide, alumina, glass balloons, shirasu balloons, silica balloons, calcium oxide, magnesium oxide and silicon oxide, and organic fillers such as powdered rubber, regenerated rubber, finely divided thermoplastic or thermosetting resins, and hollow bodies of polyethylene or the like. These fillers may be used singly or two or more of them may be used in combination.

From the workability viewpoint, the filler is used preferably in an amount of about 3 to 300 parts by weight, more preferably about 10 to 150 parts by weight, per 100 parts by weight of the polyether oligomer, namely component (A).

As specific examples of the above solvent, there may be mentioned hydrocarbons such as toluene, xylene, n-hexane and cyclohexane, acetate esters such as ethyl acetate and butyl acetate, alcohols such as methanol, ethanol, isopropanol and n-butanol, ethers such as ethylcellosolve, butylcellosolve and cellosolve acetate, ketones such as methyl ethyl ketone, ethyl acetoacetate, acetylacetone, diacetone alcohol, methyl isobutyl ketone, acetone, cyclohexanone and cyclooctanone, and other nonreactive solvents. Such solvents may be used without any particular restriction.

As the other additives, there may be mentioned, among others, antisagging agents such as hydrogenated castor oil, organic bentonite and calcium stearate, colorants and antioxidants such as ultraviolet absorbers and light stabilizers.

The method of producing the curable composition of the present invention which comprises the component (A) and the component (B) and/or (C) is not particularly restricted but conventional methods may be employed, for example the method comprising mixing the component (A) with the component (B) and/or (C) and kneading the mixture using a mixer, roll or kneader, for instance, and the method comprising dissolving the respective components using a solvent for mixing them together.

The present invention, which has the above constitution, makes it possible to obtain curable compositions having good storage stability by introducing a methyl group into the above oligomer in the vicinity of the reactive silicon group to thereby reduce the reactivity of the reactive silicon group and enhance the effect of the hydrolyzable silicon compound when it is added as a dehydrating agent. Further, it is now possible to add those kinds of hydrolyzable silicon compounds which have never been possible to add. In cases where an amino group-containing alkoxysilane or amino-substituted alkoxysilane derivative compound is added, curable compositions having good storage stability can be obtained even when it is added in the presence of water.

BEST MODES FOR CARRYING OUT THE INVENTION

The following specific examples further illustrate the present invention. They are, however, by no means limitative of the scope of the present invention.

Synthesis Examplei1

Polypropylene oxide with a number average molecular weight (terminal group-based molecular weight calculated based on terminal group concentration determination) of about 10,000 was prepared by polymerizing propylene oxide using polypropylene oxide with a molecular weight of about 2,000 as an initiator, together with a zinc hexacyanocobaltate-glyme complex catalyst. To this hydroxy-terminated polyether oligomer was then added 1.2 equivalents, relative to the hydroxy groups of said oligomer, of a methanolic solution of NaOMe. The methanol was then distilled off, and the terminal hydroxy groups were each converted to a methallyl group by adding 3-chloro-2-methyl-1-propene, to give bifunctional polypropylene oxide (a1) having a methallyl group at each terminal and having a number average molecular weight of about 10,000.

Synthesis Example 2

Polypropylene oxide with a number average molecular weight (terminal group-based molecular weight calculated based on terminal group concentration determination) of about 19,000 was prepared by polymerizing propylene oxide using trifunctional polypropylene oxide with a molecular weight of about 3,000 as an initiator, together with a zinc hexacyanocobaltate-glyme complex catalyst. To this hydroxy-terminated polyether oligomer was then added 1.2 equivalents, relative to the hydroxy groups of said oligomer, of a methanolic solution of NaOMe. The methanol was then distilled off, and the terminal hydroxy groups were each converted to a methallyl group by adding 3-chloro-2-methyl-1-propene, to give trifunctional polypropylene oxide (a2) having a methallyl group at each terminal and having a number average molecular weight of about 19,000.

Synthesis Example 3

Polypropylene oxide with a number average molecular weight (terminal group-based molecular weight calculated based on terminal group concentration determination) of about 10,000 was prepared by polymerizing propylene oxide using polypropylene oxide with a molecular weight of about 2,000 as an initiator, together with a zinc hexacyanocobaltate-glyme complex catalyst. To this hydroxy-terminated polyether oligomer was then added 1.2 equivalents, relative to the hydroxy groups of said oligomer, of a methanolic solution of NaOMe. The methanol was then distilled off, and the terminal hydroxy groups were each converted to an allyl group by adding 3-chloro-1-propene, to give bifunctional polypropylene oxide (b1) having an allyl group at each of both terminals and having a number average molecular weight of about 10,000.

Synthesis Example 4

Polypropylene oxide with a number average molecular weight (terminal group-based molecular weight calculated based on terminal group concentration determination) of about 19,000 was prepared by polymerizing propylene oxide using trifunctional polypropylene oxide with a molecular weight of about 3,000 as an initiator, together with a zinc hexacyanocobaltate-glyme complex catalyst. To this hydroxy-terminated polyether oligomer was then added 1.2 equivalents, relative to the hydroxy groups of said oligomer, of a methanolic solution of NaOMe. The methanol was then distilled off, and the terminal hydroxy groups were each converted to an allyl group by adding 3-chloro-1-propene, to give allyl-terminated trifunctional polypropylene oxide (b2) having a number average molecular weight of about 19,000.

Synthesis Example 5

A one-liter autoclave was charged with 500 g of (a1) obtained in Synthesis Example 1 and 10 g of hexane, and azeotropic dehydration was conducted at 90° C. After distilling off the hexane under reduced pressure, the vessel inside was substituted with 8% $O_2/N_2$, 25 µl of a 1% (by weight) solution of sulfur in toluene and 56 µl of a 3% (by weight; as platinum) solution of platinum-divinyldisiloxane complex in xylene were added thereto, and 24.2 g of dimethoxymethylsilane was then added dropwise. The resulting mixture was heated at 90° C. for 5 hours to allow the reaction to proceed, and the unreacted portion of dimethoxymethylsilane was distilled off under reduced pressure, to give a reactive silicon group-containing polyether oligomer (a), with a number average molecular weight of about 10,000 (terminal group-based molecular weight calculated from the polystyrene converted molecular weight determined by GPC) and a silyl group introduction percentage of 97% as determined by NMR.

Synthesis Example 6

A one-liter autoclave was charged with 500 g of (a2) obtained in Synthesis Example 2 and 10 g of hexane, and azeotropic dehydration was conducted at 90° C. After distilling off the hexane under reduced pressure, the vessel inside was substituted with 8% $O_2/N_2$, 25 µl of a 1% (by weight) solution of sulfur in toluene and 56 µl of a 3% (by weight; as platinum) solution of platinum-divinyldisiloxane complex in xylene were added thereto, and 20.5 g of dimethoxymethylsilane was then added dropwise. The resulting mixture was heated at 90° C. for 5 hours to allow the reaction to proceed, and the unreacted portion of dimethoxymethylsilane was distilled off under reduced pressure, to give a reactive silicon group-containing polyether oligomer (b), with a number average molecular weight of about 19,000 (terminal group-based molecular weight calculated from the polystyrene converted molecular weight determined by GPC) and a silyl group introduction percentage of 95% as determined by NMR.

Synthesis Example 7

A one-liter autoclave was charged with 500 g of (b1) obtained in Synthesis Example 3 and 10 g of hexane, and azeotropic dehydration was conducted at 90° C. After distilling off the hexane under reduced pressure, the vessel inside was substituted with $N_2$, 30 µl of a 3% (by weight; as platinum) solution of platinum-divinyldisiloxane complex in xylene was added thereto, and 9.0 g of dimethoxymethylsilane was then added dropwise. The resulting mixture was heated at 90° C. for 2 hours to allow the reaction to proceed, and the unreacted portion of dimethoxymethylsilane was distilled off under reduced pressure, to give a reactive silicon group-containing polyether oligomer (c), with a number average molecular weight of about 10,000 (terminal group-based molecular weight calculated from the polystyrene converted molecular weight determined by GPC) and a silyl group introduction percentage of 77% as determined by NMR.

Synthesis Example 8

A one-liter autoclave was charged with 500 g of (b2) obtained in Synthesis Example 4 and 10 g of hexane, and azeotropic dehydration was conducted at 90° C. After distilling off the hexane under reduced pressure, the vessel inside was substituted with $N_2$, 30 µl of a 3% (by weight; as platinum) solution of platinum-divinyldisiloxane complex in xylene was added thereto, and 7.0 g of dimethoxymethylsilane was then added dropwise. The resulting mixture was heated at 90° C. for 2 hours to allow the reaction to proceed, and the unreacted portion of dimethoxymethylsilane was distilled off under reduced pressure, to give a reactive silicon group-containing polyether oligomer (d), with a number average molecular weight of about 19,000 (terminal group-based molecular weight calculated from the polystyrene converted molecular weight determined by GPC) and a silyl group introduction percentage of 78% as determined by NMR.

EXAMPLE 1

Fifty grams (50 g) of the reactive silicon group-containing polyether oligomer (a) or (b) was placed in a tightly sealable glass vessel, together with 0.5 g of trimethoxyvinylsilane and 0.1 g of $H_2O$. After stirring the mixture, dibutyltin diacetylacetonate (product of Nitto Kasei; trademark Neostann U-220) was added as a curing catalyst, and the whole mixture was stirred. The vessel was then tightly closed and, after 3 days of curing at room temperature, the change in viscosity was measured using a BM type viscometer (rotor No. 4). The viscosity values thus obtained are shown in Table 1.

EXAMPLE 2

Fifty grams (50 g) of the reactive silicon group-containing polyether oligomer (a) or (b) was placed in a tightly sealable glass vessel, together with 1.25 g of triethoxyvinylsilane and 0.1 g of $H_2O$. After stirring the mixture, dibutyltin diacetylacetonate (product of Nitto Kasei; trademark Neostann U-220) was added as a curing catalyst, and the whole mixture was stirred. The vessel was then tightly closed and, after 3 days of curing at room temperature, the change in viscosity was measured using a BM type viscometer (rotor No. 4). The viscosity values thus obtained are shown in Table 1.

Comparative Example 1

Fifty grams (50 g) of the reactive silicon group-containing polyether oligomer (c) or (d) was placed in a tightly sealable glass vessel, together with 0.5 g of trimethoxyvinylsilane and 0.1 g of $H_2O$. After stirring the mixture, dibutyltin diacetylacetonate (product of Nitto Kasei; trademark: Neostann U-220) was added as a curing catalyst, and the whole mixture was stirred. The vessel was then tightly closed and, after 3 days of curing at room temperature, the change in viscosity was measured using a BM type viscometer (rotor No. 4). The viscosity values thus obtained are shown in Table 1.

Comparative Example 2

Fifty grams (50 g) of the reactive silicon group-containing polyether oligomer (c) or (d) was placed in a tightly sealable glass vessel, together with 0.5 g of triethoxyvinylsilane and 0.1 g of $H_2O$. After stirring the mixture, dibutyltin diacetylacetonate (product of Nitto Kasei;

trademark: Neostann U-220) was added as a curing catalyst, and the whole mixture was stirred. The vessel was then tightly closed and, after 3 days of curing at room temperature, the change in viscosity was measured using a BM type viscometer (rotor No. 4). The viscosity values thus obtained are shown in Table 1.

TABLE 1

| | Oligomer | Hydrolyzable silicon compound | Viscosity (poises) Before cure | After cure | Viscosity increase (times) |
|---|---|---|---|---|---|
| Ex. 1 | a | Trimethoxy- | 46 | 72 | 1.6 |
| | b | vinylsilane | 210 | 486 | 2.3 |
| Ex. 2 | a | Triethoxy- | 41 | 58 | 1.4 |
| | b | vinylsilane | 170 | 640 | 3.8 |
| Compar. Ex. 1 | c | Trimethoxy- | 53 | 130 | 2.5 |
| | d | vinylsilane | 245 | Gelation | |
| Compar. Ex. 2 | c | Triethoxy- | 46 | 89 | 1.9 |
| | d | vinylsilane | 180 | Gelation | |

EXAMPLE 3

Fifty grams (50 g) of the reactive silicon group-containing polyether oligomer (a) was placed in a tightly sealable glass vessel, together with 1.5 g of N-(β-aminoethyl)-γ-aminopropyltrimethoxysilane (product of Nippon Unicar; product name: A-1120) and 0.25 g of $H_2O$. After stirring the mixture, the vessel was tightly closed and, after 7 days of curing at 50° C., the change in viscosity was measured using a BM type viscometer (rotor No. 4). The viscosity values thus obtained are shown in Table 2.

EXAMPLE 4

Fifty grams (50 g) of the reactive silicon group-containing polyether oligomer (a) was placed in a tightly sealable glass vessel, together with 1.8 g of N-(β-aminoethyl)-γ-aminopropyltriethoxysilane (product of Shin-Etsu Chemical; product name: KBE 603) and 0.25 g of $H_2O$. After stirring the mixture, the vessel was tightly closed and, after 7 days of curing at 50° C., the change in viscosity was measured using a BM type viscometer (rotor No. 4). The viscosity values thus obtained are shown in Table 2.

EXAMPLE 5

Fifty grams (50 g) of the reactive silicon group-containing polyether oligomer (a) was placed in a tightly sealable glass vessel, together with 1.4 g of N-(β-aminoethyl)-γ-aminopropylmethyldimethoxysilane (product of Shin-Etsu Chemical; product name: KBM 602) and 0.25 g of $H_2O$. After stirring the mixture, the vessel was tightly closed and, after 7 days of curing at 50° C., the change in viscosity was measured using a BM type viscometer (rotor No. 4). The viscosity values thus obtained are shown in Table 2.

Comparative Example 3

Fifty grams (50 g) of the reactive silicon group-containing polyether oligomer (c) was placed in a tightly sealable glass vessel, together with 1.5 g of N-(β-aminoethyl)-γ-aminopropyltrimethoxysilane (product of Nippon Unicar; product name: A-1120) and 0.25 g of $H_2O$. After stirring the mixture, the vessel was tightly closed and, after 7 days of curing at 50° C., the change in viscosity was measured using a BM type viscometer (rotor No. 4). The viscosity values thus obtained are shown in Table 2.

Comparative Example 4

Fifty grams (50 g) of the reactive silicon group-containing polyether oligomer (c) was placed in a tightly sealable glass vessel, together with 1.8 g of N-(β-aminoethyl)-γ-aminopropyltriethoxysilane (product of Shin-Etsu Chemical; product name: KBE 603) and 0.25 g of $H_2O$. After stirring the mixture, the vessel was tightly closed and, after 7 days of curing at 50° C., the change in viscosity was measured using a BM type viscometer (rotor No. 4). The viscosity values thus obtained are shown in Table 2.

Comparative Example 5

Fifty grams (50 g) of the reactive silicon group-containing polyether oligomer (c) was placed in a tightly sealable glass vessel, together with 1.4 g of N-(β-aminoethyl)-γ-aminopropylmethyldimethoxysilane (product of Shin-Etsu Chemical; product name: KBM 602) and 0.25 g of $H_2O$. After stirring the mixture, the vessel was tightly closed and, after 7 days of curing at 50° C., the change in viscosity was measured using a BM type viscometer (rotor No. 4). The viscosity values thus obtained are shown in Table 2.

TABLE 2

| | Oligomer | Aminosilane | Viscosity (poises) Before cure | After cure | Viscosity increase (times) |
|---|---|---|---|---|---|
| Example 3 | a | A-1120 | 46 | 55 | 1.20 |
| Example 4 | a | KBE603 | 42 | 52 | 1.24 |
| Example 5 | a | KBM602 | 49 | 54 | 1.10 |
| Compar. Ex. 3 | c | A-1120 | 52 | 81 | 1.56 |
| Compar. Ex. 4 | c | KBE603 | 48 | 75 | 1.56 |
| Compar. Ex. 5 | c | KBM602 | 50 | 65 | 1.30 |

From Tables 1 and 2, it was found that the curable compositions of Examples 1 to 5 showed less viscosity increases, hence better storage stability, as compared with the curable compositions of Comparative Examples 1 to 5.

What is claimed is:

1. A curable composition which comprises
   (A) a reactive silicon group-containing polyether polymer and at least one species selected from the following (B) and (C):
   (B) a hydrolyzable silicon compound having a hydrolyzable group bound to a silicon atom, said hydrolyzable group being more reactive with $H_2O$ than the silicon group in the above reactive silicon group-containing polyether polymer and
   (C) an amino group-containing alkoxysilane or amino-substituted alkoxysilane derivative compound,
   said (A) reactive silicon group-containing polyether polymer having a partial structure of the general formula (1) per molecule:

$$—O—R^1—CH(CH_3)—CH_2—(Si(R^2{}_{2-b})(X_b)O)_m Si (R^3{}_{3-a})X_a \quad (1)$$

wherein $R^1$ represents a divalent organic group containing 1 to 20 carbon atoms and one or more constituent atoms selected from the group consisting of hydrogen, oxygen and nitrogen; $R^2$ and $R^3$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO—$; when 2 or more $R^2$ or $R^3$ groups are present, they may be the same or different, R' represents a monovalent hydrocarbon group containing 1 to 20 carbon atoms and three R' groups may be the same or different; X represents a hydroxyl group or a hydrolyzable group and when two or more X groups are present, they may be the same or different; a represents 0, 1, 2 or 3; b represents 0, 1 or 2; b may be the same or different over m repeats of $(Si(R^2{}_{2-b})(X_b)O)$; m represents an integer of 0 to 19; provided that the relation of $a+b \geq 1$ is satisfied.

2. The curable composition according to claim 1 wherein $R^1$ in said (A) represents $CH_2$.

3. The curable composition according to claim 1 wherein said (A) reactive silicon group-containing polyether polymer has a partial structure of the following formula:

$$—O—CH_2—CH(CH_3)—CH_2—Si(CH_3)(OCH_3)_2.$$

4. The curable composition according to claim 1 wherein said (A) reactive silicon group-containing polyether polymer is obtainable by reacting a polyether polymer containing an unsaturated bond of the following general formula (2):

$$—O—R^1—C(CH_3){=}CH_2 \quad (2)$$

$R^1$ is as defined in claim 1,
   with a reactive silicon group-containing compound of the general formula (3):

$$H—(Si(R^2{}_{2-b})(X_b)O)_m Si(R^3{}_{3-a})X_a \quad (3)$$

$R^2$, $R^3$, a, b, m and X are as defined in claim 1, in the presence of a catalyst and a sulfur compound in an oxygen-containing atmosphere.

5. The curable composition according to claim 1 wherein said (A) reactive silicon group-containing polyether polymer has a partial structure of the following formula:

$$—O—CH_2—CH(CH_3)—CH_2—Si(CH_3)(OCH_3)_2$$

said (A) being obtainable by reacting a polyether polymer containing an unsaturated bond of the following formula:

$$—O—CH_2—C(CH_3){=}CH_2$$

with a reactive silicon group-containing compound represented by the following formula:

$$H—Si(CH_3)(OCH_3)_2$$

in the presence of a catalyst and a sulfur compound in an oxygen-containing atmosphere.

6. The curable composition according to claim 1, wherein said (B) hydrolyzable silicon compound is trimethoxyvinylsilane or triethoxyvinylsilane.

7. The curable composition according to claim 1, wherein said (C) amino group-containing alkoxysilane or amino-substituted alkoxysilane derivative compound is N-(β-aminoethyl)-γ-aminopropyltrimethoxysilane, N-(β-aminoethyl)-γ-aminopropyltriethoxysilane or N-(β-aminoethyl)-γ-aminopropylmethyldimethoxysilane.

8. The curable composition according to claim 4 wherein, in said (A) reactive silicon-containing polyether polymer, not less than 85% of the number of molecular chain terminals have the reactive silicon groups.

9. The curable composition according to claim 5 wherein, in said (A) reactive silicon-containing polyether polymer not less than 85% of the number of molecular chain terminals have the reactive silicon groups.

10. The curable composition according to claim 1 wherein, said (A) reactive silicon-containing polyether polymer is obtainable by a process containing a hydrosilylation reaction of a methallyl group-containing polyether polymer in the presence of elemental sulfur.

11. The curable composition according to claim 1 wherein, said (A) reactive silicon-containing polether polymer is obtainable by a process containing polymerization of a substituted or un substituted epoxy compound in the presence of a double metal cyanide complex catalyst.

* * * * *

UNITED STATES PATENT AND TRADEMARK OFFICE
CERTIFICATE OF CORRECTION

PATENT NO.    : 6,437,072 B1
DATED         : March 29, 2000
INVENTOR(S)   : Jyono et al.

It is certified that error appears in the above-identified patent and that said Letters Patent is hereby corrected as shown below:

<u>Title page, Item [54] and Column 1, line 1,</u>
Title, "DESCRIPTION CURABLE COMPOSITION" change to
-- CURABLE COMPOSITION --

<u>Column 19,</u>
Line 35, "a + b≧1" change to -- a + Σb≧1 --

<u>Column 20,</u>
Line 51, "un substituted" change to -- unsubstituted --

Signed and Sealed this

Fifth Day of August, 2003

JAMES E. ROGAN
*Director of the United States Patent and Trademark Office*